(No Model.)
E. BAUSCH.
MICROSCOPIC ILLUMINATOR.
No. 277,869. Patented May 22, 1883.
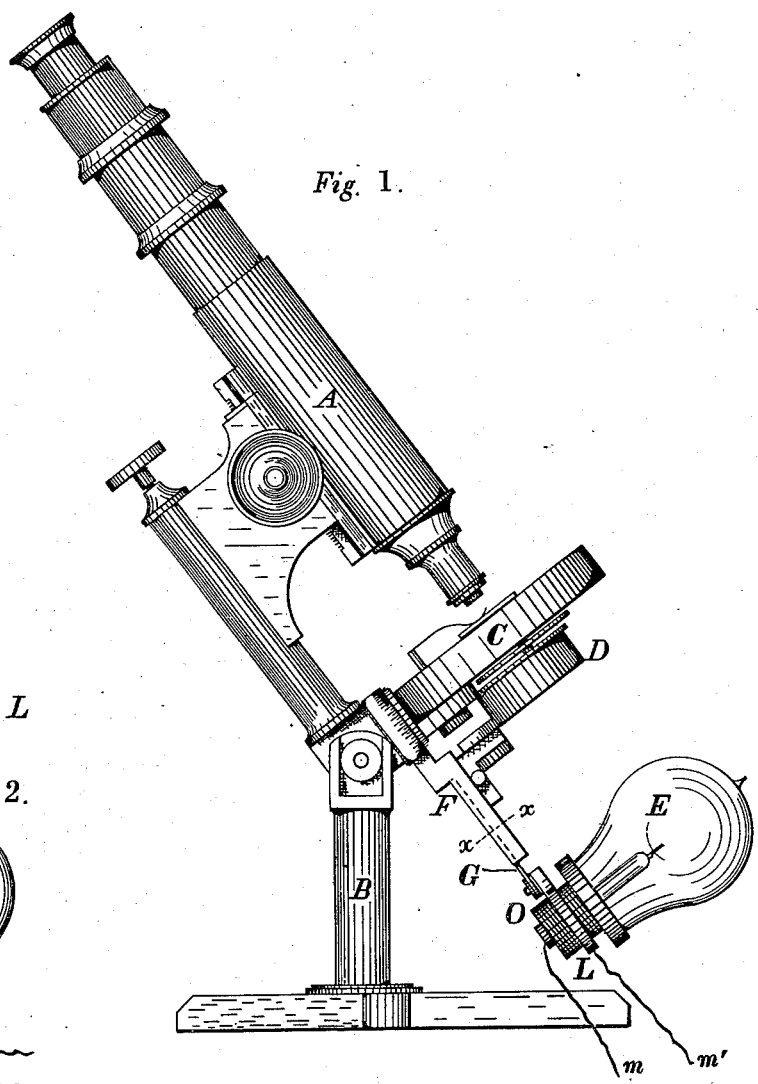
Witnesses=
H. G. Phillips.
Charles S. Hall.
Inventor=
Edward Bausch,
by Geo. B. Selden,
Atty.

UNITED STATES PATENT OFFICE.

EDWARD BAUSCH, OF ROCHESTER, NEW YORK.

MICROSCOPIC ILLUMINATOR.

SPECIFICATION forming part of Letters Patent No. 277,869, dated May 22, 1883.

Application filed June 24, 1882. (No model.)

*To all whom it may concern:*

Be it known that I, EDWARD BAUSCH, of Rochester, New York, have invented an Improved Microscopic Illuminator, of which the following is a specification, reference being had to the accompanying drawings.

My invention relates to the utilization of the electric light for the purposes of microscopic illumination; and it consists in substituting for the microscopic mirror an electric light applied directly to the mirror-bar, forming thereby a removable attachment.

My improved microscopic illuminator is represented in the accompanying drawings, in which—

Figure 1 is an elevation of the microscope embodying my invention. Fig. 2 is a front view of the electric light. Fig. 3 is a longitudinal section through the slide by which the electric light is attached to the mirror-bar or to the sub-stage bar; and Fig. 4 is a cross-section of the mirror-bar on the line $xx$, Fig. 1.

In the accompanying drawings, A is the body of the microscope; B, the standard; C, the stage, and D the sub-stage, all of which may be of any ordinary or preferred construction.

E represents an electric light, which may be of any known form. The electric light is connected with the mirror or sub-stage bar F by means of the slide G, which is arranged to slide in a dovetailed groove in the bar. This bar F is journaled, as usual, to the body of the instrument, in order that its free end may swing laterally and be carried above or below the stage, as may be demanded. The ring or socket L, which supports the electric light, is attached to the lower end of the slide G. In the longitudinal section, Fig. 3, I have represented the socket L as attached to the slide G by means of a screw, $h$, suitable insulating material, $ij$, being interposed to prevent the passage of the electric current through the microscope.

$m\ m'$ are flexible wires by which an electric current is carried to the light E from any suitable source of electricity. The wire $m'$, which is attached to the socket L, may, if desired, in the cases where the insulators $ij$ are not used, be attached to any metallic portion of the microscope, so as to complete the circuit; but I prefer to use the insulators as I have shown in the drawings. Any suitable form of sub-stage provided with devices for controlling or modifying the strength of the light may be used in connection with my invention. The electric light may be attached to the sub-stage bar instead of the mirror-bar, if preferred, and in this case the mirror may be used below the light for the purpose of increasing its strength.

In my improved microscopic illuminator the flexible wires $m\ m'$ permit the mirror-bar carrying the electric light to be swung sidewise at an angle to the optical axis of the microscope, thereby insuring obliquity in the illumination of the object on the stage, which is very desirable for many purposes. Instead of providing the mirror-bar with a dovetailed groove, as represented in the accompanying drawings, into which the slide G is fitted, the mirror-bar may be made round or square, or of any other preferred shape, the slide G being adapted thereto.

In order to adapt my improved microscopic illuminator to the different forms of instruments in which the mirror-bar is located at different distances from the prolongation of the optical axis of the microscope, the electric light is provided with a threaded hub, O, which meshes with a corresponding thread on the interior of the socket L, so that the position of the arc of light may be adjusted in a direction at right angles with the optical axis, so as to obtain a central illumination. This arrangement will be found particularly valuable in connection with microscopes adapted for making photographs, in which case it is necessary that the light should be accurately located in the optical axis.

Any suitable form of condensing apparatus may be employed with my improved microscopic illuminator, in order to throw a brilliant light on the object.

I am aware that the electric light has heretofore been employed to illuminate objects in a course of microscopic investigations, and I do not claim, broadly, the employment of the electric light for said purpose, my invention having relation to the connection of a light with a microscope by means of adjusting devices substantially such as described, whereby the light may be brought in the proper relation to the instrument and the objects therein contained, and this relationship maintained, notwithstanding the movement or adjustments which may occur in the instrument proper.

I am aware that in a printed description of a condensing or concentrating apparatus designed solely to concentrate the rays of light upon a given spot for surgical and other operations the condensing-lens has been described as combined with a gas-burner by means of intermediate connections. Said description, however, contained no allusion to or suggestion of the use of an electric light, or of the combination of a light of any kind with a microscope, and the devices described and the relationships to each other were such that they could not be practically employed with a microscope. The connection of the light with the instrument in such manner that the latter may be varied in inclination, adjustment, or position, as required, without changing the position of the light, is a feature of great convenience and advantage. The arrangement of the light-supporting bar in such manner that the light may be carried either above or below the stage at will is also a feature of importance, in that it permits the object to be illuminated on one direction or another, as its nature may require. The employment of an electric light as contradistinguished from other lights is important, not only in that it gives a more effective illumination, but in that it permits the light to be moved in all directions, to be placed at different angles, and, if required, to be completely inverted without impairing its action or disturbing the relation which the focus of the light bears to the axis of the instrument. These results cannot be obtained by any other light known in the art at the present time, and for this reason it will be seen that there exists between the electric light and a microscope a peculiar relationship or combination in which no other form of light can be substituted as an equivalent.

I claim—

1. In combination with the body A and stage C of a microscope, an electric light, E, and adjustable devices, substantially as described, connecting said light rigidly with the microscope, whereby the light may be adjusted and secured in the required relation to the axis of the instrument and the objects upon the stage, and thus maintained while permitting the instrument to be moved and adjusted, as usual.

2. In combination with the microscope proper, jointed to and adjustable upon a base, B, the electric light E, and adjusting devices, substantially as described, connecting said light rigidly with the microscope, whereby its proper relation to the instrument may be maintained, notwithstanding the movements of the latter.

3. In combination with the body and stage of a microscope, the bar F, slide G, the ring L, pivoted to said slide, and the electric light E, within and at right angles with the ring L, substantially as described.

4. In combination with the microscope proper, the electric lamp, and the movable arm connecting said light with the instrument, and adapted to admit of the light being carried above or below the stage at will.

EDWARD BAUSCH.

Witnesses:
GEO. B. SELDEN,
H. G. PHILLIPS.